United States Patent [19]

Harjar

[11] Patent Number: 4,552,502
[45] Date of Patent: Nov. 12, 1985

[54] APPARATUS FOR LOCKING THE WRIST LINKS OF A WORK ROBOT IN THE SAME RESPECTIVE RELATIVE POSITIONS TO FACILITATE CALIBRATION OF THE WRIST LINK POSITION TRANSDUCERS THEREOF

[75] Inventor: Martin J. Harjar, Vermilion, Ohio
[73] Assignee: Nordson Corporation, Amherst, Ohio
[21] Appl. No.: 539,919
[22] Filed: Oct. 7, 1983
[51] Int. Cl.$^4$ .............................................. G66C 13/00
[52] U.S. Cl. ................................... 414/680; 414/730; 414/735; 901/50
[58] Field of Search .............. 414/735, 730, 732, 680, 414/1, 2, 4, 5; 901/4, 5, 6, 7, 8, 23, 50; 73/1 J, 1 E, 432 V; 33/180 R, 181 R

[56] References Cited
U.S. PATENT DOCUMENTS 4,119,212 10/1978 Fleming ............................ 73/1 E X
4,362,977 12/1982 Evans et al. ......................... 901/3 X
4,372,721 2/1983 Harjar et al. ............................ 414/5

FOREIGN PATENT DOCUMENTS

123772 1/1949 Sweden .............................. 33/180 R
108838 8/1917 United Kingdom ............. 33/180 R Primary Examiner—Leslie J. Paperner
Assistant Examiner—Donald W. Underwood
Attorney, Agent, or Firm—Wood, Heron & Evans

[57] ABSTRACT

Apparatus is disclosed for locking the wrist links of a teaching robot and a work robot such that the wrist links of the work robot occupy the same relative positions with respect to each other as the wrist links of the teaching robot, thereby enabling the magnitude of the outputs of the corresponding wrist link position transducers of the work robot wrist and the teaching robot wrist to be equalized and the robot wrists calibrated.

3 Claims, 12 Drawing Figures

APPARATUS FOR LOCKING THE WRIST LINKS OF A WORK ROBOT IN THE SAME RESPECTIVE RELATIVE POSITIONS TO FACILITATE CALIBRATION OF THE WRIST LINK POSITION TRANSDUCERS THEREOF

This invention relates to programming a relatively massive, powered work robot with a relatively lightweight, unpowered, manually manipulatable teaching robot having links and degrees of freedom simulating those of the work robot, and more particularly to apparatus for locking the wrist links of a teaching robot and a work robot in the same respective relative positions, to facilitate calibration of the wrist link position transducers of the work and teaching robots such that their outputs are identical when their respective wrist links occupy identical predetermined positions and orientations in space.

A work-performing robot, hereinafter referred to as a work robot, typically includes a base from which extends a series of articulated links interconnected at joints to provide plural degrees of freedom, each joint having an actuator for moving the links interconnected thereat relative to each other and a position transducer for providing a signal correlated to the relative position of the associated interconnected links. At least some of the links of the work robot are relatively massive such that any effort to manually move them for the purpose of programming the robot is impractical, if not virtually impossible. To facilitate programming a relatively massive powered work robot, a relatively lightweight, manually manipulatable, unpowered teaching robot has been developed.

The teaching robot, like the work robot, has a base from which extends a series of articulated links interconnected at joints to provide plural degrees of freedom, with each joint having a position transducer for providing a signal correlated to the relative position of the links interconnected thereat. The series of links of the teaching robot, as well as the degrees of freedom thereof, simulate those of the work robot. To generate a program with a teaching robot which can be stored and thereafter input to the work robot to cause the work robot to produce the desired programmed sequence of motions, the output link of the lightweight teaching robot is manually moved through the desired sequence of motions for which it is desired to program the work robot. As the output link of the teaching robot is manually moved through the desired sequence of motions, the outputs of the link position transducers thereof are separately recorded. The recorded link position transducer outputs of the teaching robot, obtained during the course of manually manipulating the output link thereof through the desired sequence of motions, are stored. The stored teaching robot link position transducer output signals, which function as position commands, can then be input to a suitable controller associated with the work robot. The controller, on a link-by-link basis, compares the stored link position signals or commands, generated by the teaching robot during programming, against the actual position signals of the work robot generated by their associated link position transducer output signals. Errors between the programmed position signals or commands and the actual positions of the respectively associated work robot links are input to the actuators of the work robot links, causing the work robot links to execute the programmed sequence of motions through which the links of the teaching robot were manually moved during the programming phase.

To enhance the accuracy with which the work robot link motions during program execution phase emulate the motions of the teaching robot links during the teaching or program generation phase, it is important that the outputs of the work robot link position transducers be identical (or as near identical as possible) to the outputs of the teaching robot link position transducers when the respective work robot and teaching robot links occupy identical spatial positions and orientations. If the link position outputs of the work and teaching robot transducers are not equal, work robot link motions during program execution will be in error to the extent of any differences which exist between the outputs of the link position transducers of the respective robots.

One method for calibrating the link position transducers of the work and teaching robots prior to program generation with the teaching robot, such that the link position transducer outputs of the respective work and teaching robots will be identical when the corresponding links thereof occupy identical positions and orientations in space, is disclosed in co-pending application Ser. No. 539,918, filed on even date herewith, entitled "Method For Calibrating Link Position Transducers Of A Robot System Incorporating A Teaching Robot And A Work Robot", in the name of Jeffery S. Noss. The method of calibration disclosed in the foregoing patent application includes the steps of establishing a predetermined relative position for each link of the teaching robot with respect to the base or link, as the case may be, to which each such link is connected at its inner end; establishing a predetermined relative position for each link of the work robot with respect to the base or link, as the case may be, with respect to which each such link is connected at its inner end, with the predetermined relative position for each link of the work robot being the same as the predetermined relative position for the corresponding link of the teaching robot; and adjusting the outputs of the position transducers of the teaching and/or work robots, while the respective links thereof are in their respective predetermined relative positions, to equalize the outputs of the corresponding teaching and work robot position transducers.

It is an objective of this invention to provide apparatus for locking the wrist links of the teaching robot and the work robot such that the wrist links of the work robot occupy the same relative positions with respect to each other as the wrist links of the teaching robot, thereby enabling the magnitudes of the corresponding wrist link position transducers of the work robot wrist links and the teaching robot wrist links to be equalized, and the work and teaching robot wrists to be calibrated. This objective is accomplished in accordance with certain of the principles of this invention by providing, in a preferred embodiment, a wrist calibration fixture which includes outer means engageable with the rotary output member of the outermost wrist link to prevent with respect thereto when engaged therewith both (a) rotary movement of the outermost wrist rotary output member about its own axis and (b) rotary movement of the outermost wrist rotary output member about a second rotary axis coincident with the axis of the rotary output member of the link which connects to the outermost link, which second rotary axis is angled, preferably orthogonal, to the axis of rotation of the outermost wrist rotary output member; inner means engageable with the innermost wrist which link contains the innermost rotary output member of the wrist and which when so engaged is immovable with respect thereto both (a) axially along the length the link and (b) rotationally about the longitudinal axis of the link; and intermediate means rigidly interconnecting the inner means and the outer means to prevent any relative movement therebetween, the intermediate means being connected to the links disposed between the innermost and outermost wrist links solely through the inner means and the outer means, thereby locking all links of the wrist against relative movement with respect to each other.

In one preferred form of the calibration fixture, adapted for use in locking the relatively lightweight teaching robot wrist links, each of which include a rotary shaft and a housing rotatably mounting the shaft, the outer means includes a bore configured to snugly embrace the periphery of the outermost rotary wrist shaft when inserted therein, the bore having a locating element therein engageable with a corresponding locating member on the periphery of the outermost rotary wrist shaft to prevent rotation thereof relative to the bore; the inner means includes a pin disposed transversely relative to an imaginary line between the inner means and the outer means, the pin being configured to snugly fit within a correspondingly configured cavity located in the link to which the wrist is connected, with the location of the cavity being transverse relative to the longitudinal axis of the link, thereby locating the inner means axially and angularly relative to the longitudinal axis of the link; and the intermediate means includes a longitudinal bar rigidly secured at its opposite ends to the inner means and the outer means, the bar being connected relative to the links of the wrist solely through the inner means and the outer means.

In another form of calibration fixture, adapted to lock the links of a work robot wrist, each of which contain a rotary actuator, the inner and outer means are detachably interconnected to the intermediate means. The inner means, in a preferred form, includes a rectangular frame having first and second orthogonal locating surfaces for engaging adjacent orthogonal sides of the actuator of the innermost link of the wrist to position the plane established by the frame, when engaged with the innermost wrist link actuator, perpendicular to the axis of rotation of the rotary output member of the innermost wrist actuator; and a shaft disposed parallel to the frame plane and the first locating surface and perpendicular to the second locating surface. The outer means, in a preferred form, includes a bore configured to snugly embrace the periphery of the rotary output member of the outermost wrist actuator when inserted therein, the bore having a locating element engageable with a corresponding locating member in the periphery of the rotary output member of the outermost wrist actuator to prevent rotation thereof relative to the bore. The outer means also preferably includes first and second orthogonal locating surfaces which are respectively parallel and perpendicular to the rotational axis of the output member of the outermost wrist actuator when engaged in the bore of the first means. The intermediate member, in a preferred form, includes a locating bore disposed parallel to the bore of the outer means, and selectively operable clamp means for temporarily clamping the shaft of the inner means in the locating bore of the intermediate member to temporarily couple the intermediate means and the inner means. The intermediate member further preferably includes third and fourth locating surfaces which are parallel and perpendicular, respectively, to the shaft of the inner means. Also preferably included are releaseable clamp means for clamping the outer means and the intermediate means to position the first and second locating surfaces of the outer means in contact with third and fourth locating surfaces of the intermediate means. When the inner and outer means are clamped to the intermediate means, the rotary output members of the wrist actuators are mutually orthogonal and the rotary output member of the outermost wrist actuator is in a predetermined angular position.

These and other features, advantages, and objectives of the invention will be more readily apparent from a detailed description of the invention in which:

Figure 1:
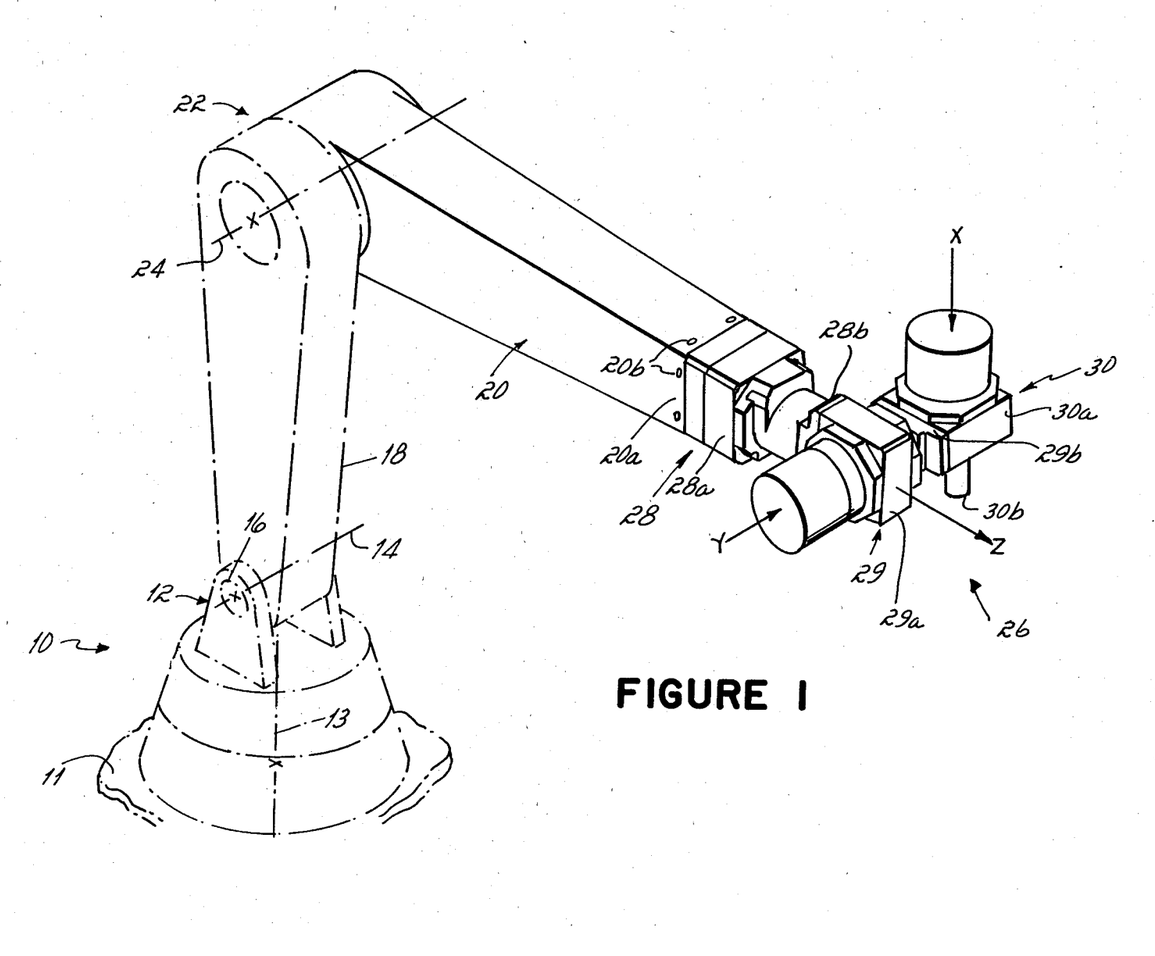
FIG. 1 is a perspective view of a six-axis work robot incorporating a three-axis wrist with respect to which the work robot wrist link locking apparatus of this invention is useful.

With reference to FIG. 1, a six-link, six-axis work robot is shown incorporating a three-axis wrist 26 with respect to which the work robot wrist locking apparatus is useful to facilitate wrist calibration. The work robot includes a base 10 which rests on the floor, ground, or other suitable stationary support 11. Extending vertically from the upper portion of the base 10 is a yoke 12. The yoke 12 is mounted by means (not shown) for rotation about a vertical axis 13. An actuator for the yoke 12, also not shown, and preferably of the rotary hydraulic type, is provided for rotating the yoke 12 bidirectionally about a vertical axis 13. The yoke 12 constitutes one link and provides one degree of freedom for the six-link, six-axis work robot shown in FIG. 1.

Extending upwardly from the yoke 12 and mounted for bidirectional rotational motion about a horizontal axis 14 by a suitable bearing or shoulder joint 16 is an arm 18. Associated with the shoulder joint 16 is an actuator (not shown), also preferably of the rotary hydraulic type, for bidirectionally rotating the arm 18 about horizontal axis 14. The arm 18 constitutes the second link and second degree of freedom of the multi-link, multi-axis work robot shown in FIG. 1.

Extending from the upper end of the arm 18 is a forearm 20. Forearm 20 is connected at its inner end to the upper end of the arm 18 by a suitable bearing or elbow joint 22 which permits bidirectional rotational motion of the forearm 20 with respect to the arm 18 about horizontal axis 24. Associated with the elbow joint 22 is a suitable actuator (not shown), preferably of the rotary hydraulic type, for imparting to the forearm 20 the desired degree of rotational motion with respect to the arm 18. The forearm 20 constitutes the third link and third degree of freedom of the work robot shown in FIG. 1.

The multi-axis work robot wrist assembly 26, with which the work robot wrist locking assembly of this invention is useful, includes three axes X, Y, and Z and is mounted to the outboard end 20a of the forearm 20. The three degrees of freedom provided by the three-axis wrist assembly 26 are provided by three bidirectional rotary hydraulic actuators 28, 29, and 30 which are mechanically series-connected. Each rotary hydraulic wrist actuator 28, 29, and 30 includes a body or housing and an output member which bidirectionally rotates relative to the body or housing, with the rotary output member of each wrist actuator being fixedly mounted to the body or housing of the successively outboard actuator.

More specifically, the rotary hydraulic actuator 28 of the wrist assembly 26, which constitutes the innermost actuator of the wrist assembly, includes a body or housing 28a which is removably secured to the outboard end 20a of forearm 20 by suitable fasteners 20b, and an output member 28b which bidirectionally rotates about the Z axis which is generally coaxial with the longitudinal axis of the forearm 20. The rotary hydraulic actuator 29, which constitutes the intermediate actuator of the wrist assembly 26, includes a body or housing 29a which is fixedly connected to the rotary output member 28b of the innermost wrist actuator 28, and an output member 29b which rotates bidirectionally with respect to the body 29 about the Y axis which is generally perpendicular to the rotational axis of the output member 28b of actuator 28. The third and outermost rotary hydraulic actuator 30 of the wrist assembly 26 includes a body or housing 30a which is rigidly secured to the rotary output member 29b of the intermediate actuator 29, and an output element 30b which is mounted for bidirectional rotary motion relative to the body 30a about an X axis which is generally perpendicular to the rotational axes of the output members 28b and 29b of the actuators 28 and 29. The rotary output member 30b of the wrist assembly actuator 30 not only constitutes the output of the wrist assembly 26, but also constitutes the output member of the six-link, six-axis work robot in which the wrist is incorporated.

Details of one form of work robot wrist 26 are disclosed and claimed in the co-pending U.S. application of Jeffrey Noss and Martin Harjar, Ser. No. 328,912, filed Dec. 9, 1981, entitled "Streamlined Multi-Axis Robot Wrist Assembly With Partially Enclosed Hydraulic And Electrical Lines To Minimize The Wrist Envelop", assigned to the assignee of the present application, the entire disclosure of which is incorporated herein by reference, now U.S. Pat. No. 4,459,898.

Figure 2:
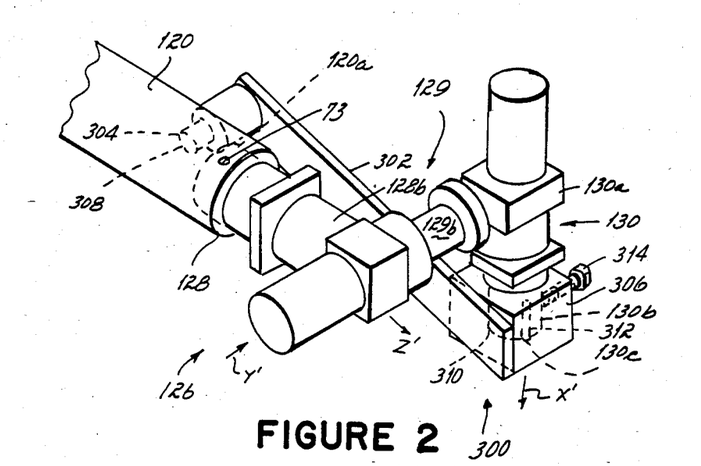
FIG. 2 is a perspective view of a wrist of a teaching robot showing the teaching robot wrist link locking apparatus installed thereon to lock the teaching robot wrist links in mutually orthogonal directions to facilitate calibration of their associated teaching robot link position transducers.

The teaching robot wrist 126, as shown in FIG. 2, includes three serially interconnected joints 128, 129, and 130 which respectively constitute the fourth, fifth, and sixth axes, or degrees of freedom, of a teaching robot, the third or forearm link 120 of which is shown extending in the Z' direction. Although not shown, serially interconnected inboard of the teaching robot forearm 120 is an elbow joint, an arm, a shoulder joint, and a yoke assembly secured to a base which rests on the ground, floor, or other suitable stationary support, which collectively provide the teaching robot with three additional degrees of freedom over and above the three degrees of freedom provided by the teaching arm wrist 126. The rotary output members 128b, 129b, and 130b of wrist joint 128, 129, and 130, respectively, are oriented along mutually orthogonal axes Z', Y', and X', respectively. Secured to the rotary output 130b of the outermost joint 130 of the teaching robot during generation of a program for the work robot is a spray coating gun 158. However, during calibration of the teaching robot wrist link transducers, in a manner to be described hereinafter, the output 130b of the outermost wrist joint 130 is connected to one end of the teaching robot wrist link locking assembly 300 to be described in detail hereafter.

The teaching robot wrist joint 128, which constitutes the innermost joint of the wrist 126, includes a housing 128a rigidly fastened with fastener 73 to the outboard end 120a of the teaching robot forearm 120. The joint housing 128a is provided with suitable bearings to facilitate rotation of the rotary output member 128b thereof about the Z' axis. Associated with the joint 128 is a suitable rotary transducer (not shown) which provides an output signal correlated to the angular rotation of the output member 128b relative to a suitable limit of rotation with respect to the joint housing 128a, which limit of rotation corresponds to a similar limit of rotation of the rotary output 28b of the work robot wrist actuator 28.

The teaching robot wrist joint 129 includes a joint housing 129a rigidly secured to the rotary output shaft 128b of the teaching robot wrist joint 128. The teaching robot wrist joint housing 129a includes suitable bearings for supporting the rotary output member 129b for rotation about the Y ' axis. A suitable angular position transducer (not shown) is associated with the teaching robot wrist joint 129 to provide an electrical signal correlated to the angular rotation of the rotary output member 129b with respect to a limit of travel of the housing 129a of rotary joint 129, which limit of travel corresponds to a similar limit of travel of the rotary output 29b of the work robot wrist actuator 29.

The rotary joint 130 of the teaching robot wrist 126 includes a joint housing 130a securely fastened to the rotary output 129b of the intermediate wrist joint 129. The housing 130a of the outermost wrist joint 130 includes suitable bearings to facilitate rotation of the rotary output member 130b about the X' axis. Associated with the outermost wrist joint 130, although not shown, is an angular position transducer which provides an electrical signal correlated to the rotary angle of the output member 130b relative to a limit of travel established by the joint housing 130a, which limit of travel corresponds to a similar limit of travel of the rotary output member 30b of the work robot wrist actuator 30. The rotary output member 130of the outermost teaching robot wrist joint 130 is provided with a longitudinal locating rib 130c. The locating rob 130c cooperates with a suitably disposed longitudinal slot provided in the bore associated with the mounting bracket for the spray gun into which the rotary output member 130b is inserted during program generation, and a similar longitudinal slot located in the bore provided in the teaching wrist locking assembly 300 into which the output member 130b is inserted during wrist calibration.

The teaching robot wrist link locking assembly 300, considered in more detail, includes an elongated bar 302 having a pin 304 rigidly fastened at one end and a mounting block 306 rigidly fastened at the other end. The pin 304 is designed to snugly interfit in a suitably disposed bore 308 disposed transversely in the outer end of the teaching robot arm 120. Engagement of pin 304 in robot arm bore 308 locates the bar both axially along the length of the arm 120, as well as locates the bar angularly relative to the Z' axis of rotation of joint output member 128b. The mounting block 306 is provided with a bore 310 having a longitudinal slot 312 in the wall thereof. During robot wrist calibration, the rotary output member 130b of the outermost teaching robot wrist joint 130 is positioned in the bore 310 with the locating rib 130c of the wrist output member located in the slot 312 of the mounting block 306. A suitable set screw 314 disposed transversely in the wall of the mounting block 306 is provided to temporarily lock the rotary output member 130b of the teaching robot wrist in the bore 310 of the mounting block 306.

The bar 302 is dimensioned and configured, in combination with the location and orientation of the bore 308 in the teaching robot arm 120, such that when pin 304 is fully engaged in bore 308 and rotary output member 130b is engaged in bore 310 with the locating rib 130 in slot 312, the rotational axes of teaching robot wrist output elements 128b, 129b, and 130b are disposed along mutually orthogonal axes Z', Y', and X', respectively, with the rotary output member 130b locked in a predetermined angular reference position with respect to its associated joint housing 130a. Under such circumstances, and with the teaching robot wrist link locking assembly 130 operatively installed on the teaching robot wrist 126, the rotary output members 128b, 129b, and 130b of the wrist are in a fixed relative position with respect to each other, thereby locking in predetermined relative position with respect to each other the outermost three links of the six-link, six-axis teaching robot of which the outermost three links constitute the wrist thereof.

Figure 3:
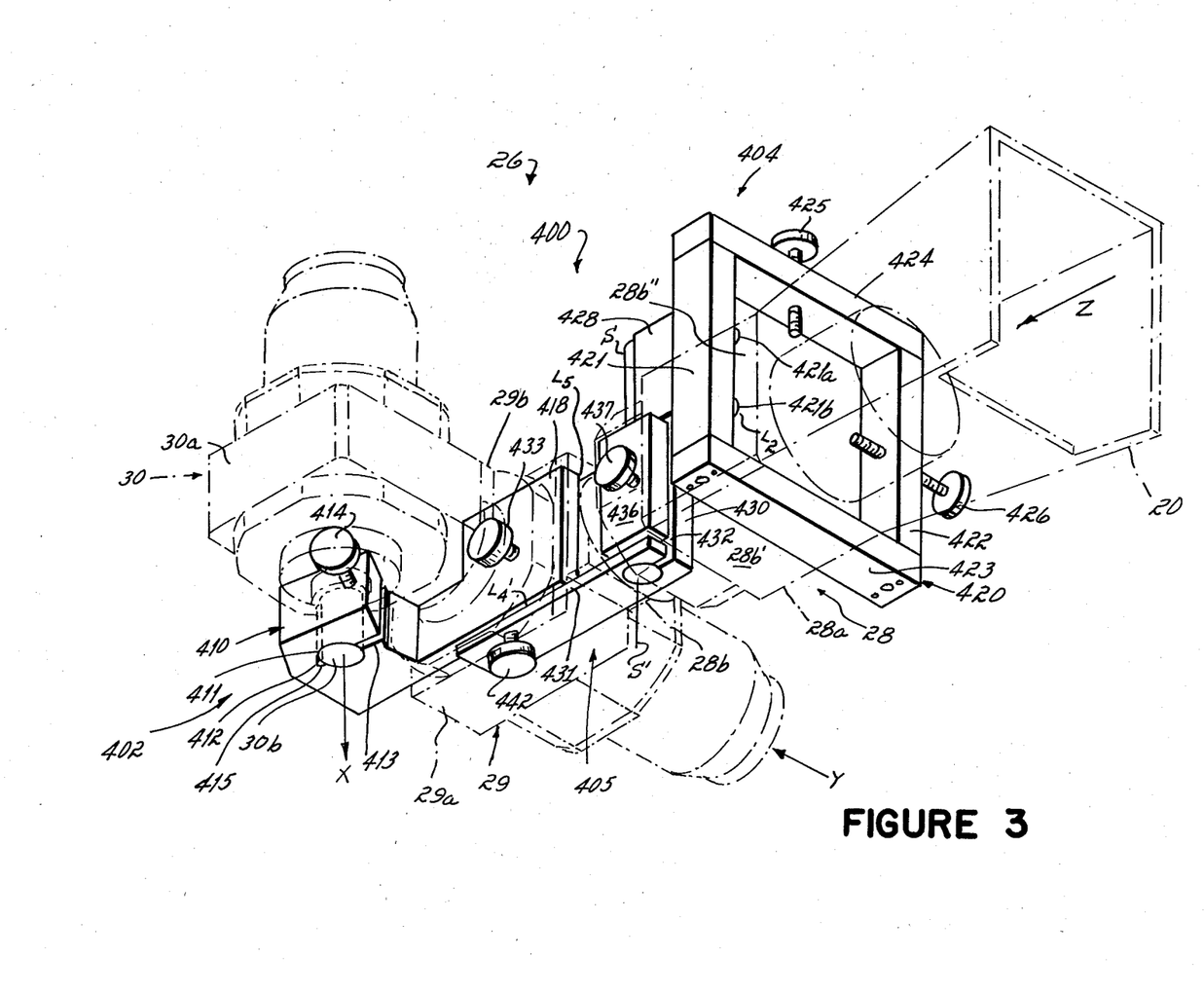
FIG. 3 is a perspective view of a wrist of the work robot of FIG. 1, showing the work robot wrist link locking apparatus installed thereon to lock the work robot wrist links in mutually orthogonal directions, identically to that of the corresponding teaching robot wrist links, to facilitate calibration of their associated work robot link position transducers.
Figure 4A:
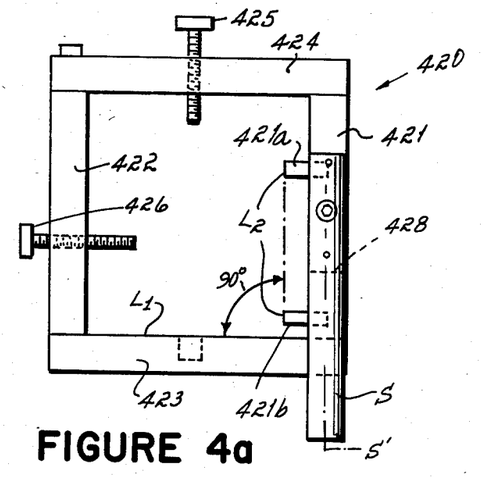
FIG. 4a is a front elevational view of the innermost subassembly of the work robot wrist locking apparatus which attaches to the actuator which drives the innermost wrist link, which actuator forms an extension of the robot link or arm immediately inboard of the wrist.
Figure 4B:
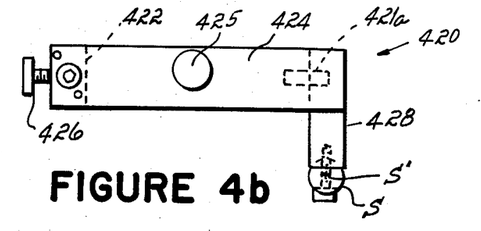
FIG. 4b is a top plan view of the innermost subassembly of the work robot wrist locking apparatus which attaches to the actuator which drives the innermost wrist link, which actuator forms an extension of the robot link or arm immediately inboard of the wrist.
Figure 4C:
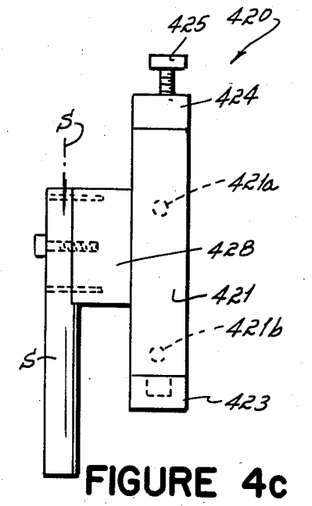
FIG. 4c is a right side elevational view of the innermost subassembly of the work robot wrist locking apparatus which attaches to the actuator which drives the innermost wrist link, which actuator forms an extension of the robot link or arm immediately inboard of the wrist.
Figure 5A:
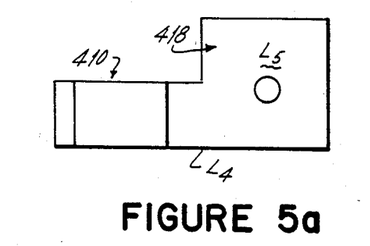
FIG. 5a is a right side elevational view of the outermost subassembly of the work robot wrist locking apparatus which attaches to the outermost wrist link, that is, the output link of the work robot.
Figure 5B:
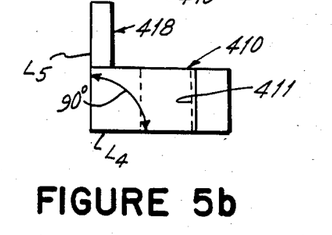
FIG. 5b is a front elevational view of the outermost subassembly of the work robot wrist locking apparatus which attaches to the outermost wrist link, that is, the output link of the work robot.
Figure 5C:
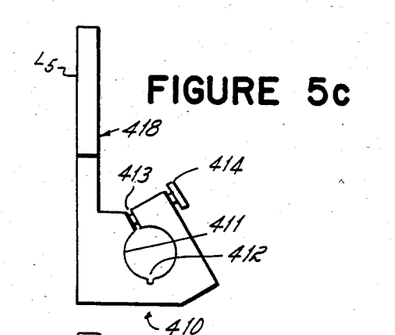
FIG. 5c is a top plan view of the outermost subassembly of the work robot wrist locking apparatus which attaches to the outermost wrist link, that is, the output link of the work robot.
Figure 6A:
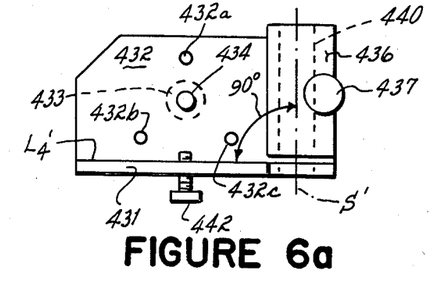
FIG. 6a is a right side elevational view of the intermediate subassembly of the work robot wrist locking apparatus which interconnects the outer subassembly shown in FIGS. 5a, 5b, and 5c and the inner subassembly shown in FIGS. 4a, 4b, and 4c.
Figure 6B:
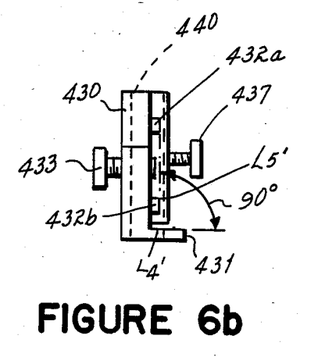
FIG. 6b is a front elevational view of the intermediate subassembly of the work robot wrist locking apparatus which interconnects the outer subassembly shown in FIGS. 5a, 5b, and 5c and the inner subassembly shown in FIGS. 4a, 4b, and 4c.
Figure 6C:
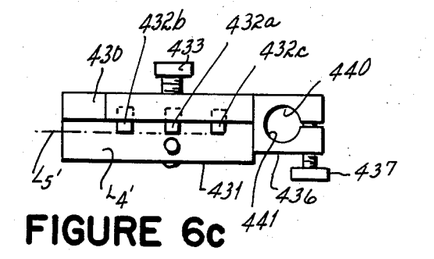
FIG. 6c is a top plan view of the intermediate subassembly of the work robot wrist locking apparatus which interconnects the outer subassembly shown in FIGS. 5a, 5b, and 5c and the inner subassembly shown in FIGS. 4a, 4b, and 4c.

The work robot link locking assembly 400, as more particularly seen in FIG. 3, includes an outer subassembly 402 which is secured to the outermost link 30b of the work robot wrist 26 which constitutes the output of the work robot, an inner subassembly 404 which is removably secured to the housing 28a of the innermost work robot wrist actuator 28, and an intermediate subassembly 405 which interconnects the outer subassembly 402 and the inner subassembly 404 in a manner such that the rotational axes X, Y, and Z of the work robot actuator outputs 30b, 29b, and 28b respectively, are mutually orthogonal and the rotational position of the outermost work robot wrist output shaft 30b is in a preset known angular position with respect to the actuator housing 30a.

The outer subassembly 402 includes a mounting block 410 having a bore 411 therein which is provided with a longitudinal slot 412 disposed parallel to the axis of the bore 411. The wall of the mounting block 410 is slotted at 413 to enable the diameter of the bore 411 to reduce in size for clamping the rotary output shaft 30b of the outermost wrist actuator 30 when it is inserted in bore 411 and the associated clamping screw 414 is tightened. To angularly locate the output shaft 30b of the outermost wrist actuator 30 relative to the bore 411 of the outer subassembly mounting block 410 the actuator output shaft 30b is provided with a longitudinal ridge 415 disposed parallel to its longitudinal axis. When the actuator output shaft 30b is located in the bore 411 of the mounting block 410 with the ridge 415 in slot 412, the angular position of the actuator output shaft is in a predetermined known position with respect to the mounting block 410 of the outer subassembly 402. Additionally, the rotational axis X of the actuator output shaft 30b is parallel to a locating plane L5 to be described and perpendicular to a locating plane L4, also to be described, both locating planes of which constitute integral surfaces of a plate 418 which is integral with and extends laterally from the mounting block 410 of the outer subassembly 402.

The inner subassembly 404 of the work robot wrist link locking assembly 400 includes a rectangular frame 420 consisting of vertical, equal length, parallel side members 421 and 422 and upper and lower, equal length, parallel members 423 and 424 between which are sandwiched in spaced apart relation the vertical side members 421 and 422. Suitable threaded fasteners are provided in the ends of the upper and lower members 423 and 424 to facilitate assembly and disassembly of the rectangular frame 420 with respect to the innermost actuator 28 of the work robot wrist 26. The upper surface L1 of the lower rectangular frame member 423 constitutes a locating surface for the frame 420. A second surface L2 is defined by the inwardly projecting ends of pins 421a and 421b extending inwardly from and mounted in the vertical frame member 421, and constitutes a second locating surface for the frame 420 which is perpendicular to the locating surface L1. Locating surfaces L1 and L2 of the rectangular frame 420 cooperate with perpendicular outer wall surfaces 28b' and 28b" of the housing 28a of actuator 28, when screws 425 and 426 threaded in frame members 424 and 422, respectively, are advanced inwardly against outer walls of the housing 28b of actuator 28 disposed parallel to walls 28b' and 28b", respectively, to locate the longitudinal axis S' of a vertical shaft S perpendicular to the plane containing the longitudinal axis of the output shaft of actuator 28 which is disposed along the Z axis. Shaft S is rigidly mounted to the rectangular frame 420 by a bracket 428 such that the axis S' is perpendicular to the plane containing the locating surface L1 and parallel to locating surface L2. Thus, with the rectangular frame 420 properly mounted relative to the actuator 28, the axis S' of shaft S is perpendicularly offset relative to the Z axis of rotation of actuator output 28b, that is, axis S' lies in an imaginary plane which is perpendicular to the Z axis of rotation of the rotary output of actuator 28 and is parallel to a second imaginary plane containing the Z axis, which second imaginary plane is perpendicular to the first imaginary plane.

The intermediate subassembly 405, which interconnects the outer subassembly 402 and the inner subassembly 404 of the work robot wrist link locking assembly 400, includes a vertically disposed plate 430 having extending horizontally from the lower edge thereof a lip 431. The front vertical surface 432 of the plate 430 is provided with three pins 432a, 432b, and 432c disposed at the apices of a triangle and projecting perpendicularly outwardly from the vertical surface 432. The outer ends of the pins 432a, 432b, and 432c constitute a locating surface L5' designed to be in contact with and parallel to locating surface L5 of plate 418 of the outer subassembly 402. A locking screw 433 passing through an oversized bore in the plate 418 engages a threaded bore 434 formed in the plate 430 for urging locating surface L5 of plate 418 into contact with the confronting ends of locating pins 432a, 432b, and 432c extending from plate 430 which define locating surface L5'.

The locating plane L5 defined by outer ends of pins 432a, 432b, and 432c extending from surface 432 of plate 430 is parallel to the longitudinal axis S' of the shaft S associated with rectangular frame 420 of inner subassembly 404 when the shaft S is tightly sandwiched between plate 430 and a clamping block 436. A threaded fastener 437 passes through a bore in clamping block 436 and threadedly engages a threaded bore 438 formed in plate 430 for urging the block 436 toward the plate 430 to clamp the shaft S between the block 436 and the plate 430. The confronting surfaces of the plate 430 and the clamp block 436 are provided with vertical semi-cylindrical bores 440 and 441 which are disposed such that when the shaft S is clamped therebetween by tightening the fastener 437 the longitudinal axis S' of the shaft S is parallel to the locating surface L5' defined by the outer ends of the locating pins 432a, 432b, and 432c and is perpendicular to the upper surface L4' of the lip 431.

A threaded fastener 442 which passes through an oversize bore formed in the lip 431 engages a threaded vertical bore formed in the plate 418 for urging locating surfaces L4 and L4', associated with the upper surface of lip 431 and the lower surface of plate 418, into intimate physical contact.

With the outer subassembly 410 mounted on the output shaft 30b of the outer actuator 30 in the manner described, the inner subassembly 404 mounted to the inner wrist actuator 28 in the manner described, and the outer and inner subassemblies 402 and 404 interconnected by the intermediate subassembly 405 in the manner described, the X, Y, and Z axes of the rotary output members 30b, 29b, and 28b, respectively, of the actuators 30, 29, and 28, respectively, are mutually perpendicular, and additionally, the angular position of the outermost actuator output shaft 30b is in a predetermined angular relationship with respect to the actuator housing 30a of the outer actuator 30. Under such circumstances, and assuming fixture 300 is mounted on the teaching robot wrist, and further assuming the rib 130c of training arm output shaft 130b and the associated slot 312 of training arm fixture 300 are located to correspond to that of rib 415 on work robot output shaft 30b and slot 412 on the work robot locking assembly 400, the corresponding links of the work robot wrist and teaching arm robot wrist are identically oriented relative to each other, thereby facilitating calibration of the transducers associated with the work robot wrist actuators and the teaching arm robot wrist joints.

In operation, and by way of summary, installation of the work robot wrist link locking assembly 400 is accomplished by first mounting the block 410 of outer subassembly 402 on actuator output shaft 30b with the shaft rib 415 engaged in slot 412 of bore 11 provided in mounting block 410. When the outer subassembly 402 has been mounted on the actuator output shaft 30b in the manner indicated, the clamp screw 414 is tightened to lock outer subassembly 402 relative to the output shaft 30b of the outer work robot wrist actuator 30. The rectangular frame 420 of the inner subassembly 404, which is disassembled, is then placed in surrounding relationship to the housing 28b of the inner working robot wrist actuator 28, and when so positioned and re-assembled in surrounding relationship thereto, the clamp screws 425 and 426 are advanced inwardly to locate surfaces L1 and L2 parallel to actuator surfaces 28b' and 28b". Plate 430 of the intermediate subassembly 405 is then loosely mounted on the shaft S sandwiched between plate 430 and clamping block 436. Plate 418 of the outer subassembly 402 and plate 430 of the intermediate subassembly 405 are rotated toward each other to bring locating surface L5 into contact with the locating surface L5' defined by pins 432a, 433b, and 432c. Simultaneously, the plate 430 is adjusted vertically with respect to the shaft S to bring locating surfaces L4 and L4' of plate 418 and lip 431 into physical contact. With surfaces L4' and L4 in contact, and surface L5 and L5' in contact, clamp screws 433 and 442 are tightened to maintain the aforesaid locating surfaces in contact with each other, thereby locking the outer subassembly 402 relative to the intermediate subassembly 405. The clamping screw 437 is then tightened to lock the inner subassembly 404 relative to the intermediate subassembly 405. With the outer subassembly 402 and the inner subassembly 404 locked relative to the intermediate subassembly 405, the outer subassembly 402 and inner subassembly 404 are locked in relation to each other.

What is claimed is:

1. A fixture to facilitate calibrating position transducers respectively associated with at least three different articulated links serially connected in a chain to define a multi-link, multi-axis robot, each robot link including a rotary output member and a housing rotatably mounting said output member, each robot link of the chain further including means securing the housing associated therewith to the rotary output member associated with the next adjacent inner link of the chain, said fixture comprising:

outer means engageable with the rotary output member of the outermost link of the chain to prevent with respect to said outer means when engaged therewith both (a) rotary movement of said outermost rotary output member about its own axis and (b) rotary movement of said outermost rotary output member about a second rotary axis coincident with the axis of the rotary member which is secured to the actuator housing of the outermost link, which second rotary axis is angled to said axis of rotation of said outermost rotary output member, said outer means including a bore configured to snugly embrace the periphery of said outermost rotary output member when inserted therein, said bore having a locating element therein engageable with a corresponding locating member on the periphery of said outermost rotary output member to prevent rotation of said outermost rotary output member relative to said bore, inner means engageable with the innermost link which includes said housing for the innermost rotary output member, said inner means when engaged with said innermost link being immovable relative thereto both (a) axially along the length of said innermost link and (b) rotationally about the longitudinal axis of said innermost link, and intermediate means rigidly interconnecting said inner and outer means to prevent any relative movement therebetween, said intermediate means being connected relative to links disposed between said innermost link and said outermost link, solely through said inner means and said outer means, thereby locking all links of said chain against relative movement with respect to each other, and wherein said inner means and said intermediate means are detachable, said axis of rotation of said outermost rotary output member is orthogonal to the axis of the rotary output member which is secured to the actuator housing of said outermost link, said inner means includes
  a rectangular frame having first and second orthogonal locating surfaces for engaging adjacent orthogonal sides of said innermost link of said chain to position the plane established by said frame, when said frame is engaged with said innermost link, perpendicular to the axis of rotation of said innermost rotary output member, and
  a shaft disposed parallel to said frame plane and said first locating surface and perpendicular to said second locating surface, and said intermediate member includes
  a locating bore disposed parallel to said bore of said outer means, and
  selectively operable clamp means for temporarily clamping said shaft in said locating bore to temporarily couple said intermediate means and said inner means, and thereby orient the rotational axes of said rotary output members in mutually orthogonal directions when said intermediate means and inner means are temporarily coupled, and said frame is engaged with said outmost link, and said outermost rotary output member is engaged in said bore of said outer means.

2. A fixture to facilitate calibrating position transducers respectively associated with at least three different articulated links serially connected in a chain to define a multi-link, multi-axis robot, each robot link including a rotary output member and a housing rotatably mounting said output member, each robot link of the chain further including means securing the housing associated therewith to the rotary output member associated with the next adjacent inner link of the chain, said fixture comprising:

outer means engageable with the rotary output member of the outermost link of the chain to prevent with respect to said outer means when engaged therewith both (a) rotary movement of said outermost rotary output member about its own axis and (b) rotary movement of said outermost rotary output member about a second rotary axis coincident with the axis of the rotary member which is secured to the actuator housing of the outermost link, which second rotary axis is angled to said axis of rotation of said outermost rotary output member, said outer means including a bore configured to snugly embrace the periphery of said outermost rotary output member when inserted therein, said bore having a locating element therein engageable with a corresponding locating member on the periphery of said outermost rotary output member to prevent rotation of said outermost rotary output member relative to said bore, inner means engageable with the innermost link which includes said housing for the innermost rotary output member, said inner means when engaged with said innermost link being immovable relative thereto both (a) axially along the length of said innermost link and (b) rotationally about the longitudinal axis of said innermost link, and intermediate means rigidly interconnecting said inner and outer means to prevent any relative movement therebetween, said intermediate means being connected relative to links disposed between said innermost link and said outermost link, solely through said inner means and said outer means, thereby locking all links of said chain against relative movement with respect to each other, and wherein said outer means and said intermediate means are detachable, and said inner means and intermediate means are detachable, said inner means includes
  a rectangular frame having first and second orthogonal locating surfaces for engaging adjacent orthogonal sides of said innermost link of said chain to position the plane established by said frame, when said frame is engaged with said innermost link, perpendicular to the axis of rotation of said innermost rotary output member, and
  a shaft disposed parallel to said frame plane and said first locating surface and perpendicular to said second locating surface, and said intermediate member includes
  a locating bore, and
  selectively operable clamp means for temporarily clamping said shaft in said locating bore to temporarily couple said intermediate means and said inner means, said outer means includes third and fourth orthogonal locating surfaces which are respectively parallel and perpendicular to the rotational axis of said outermost rotary output member when engaged in said bore of said outer means, said intermediate means further including fifth and sixth orthogonal locating surfaces which are respectively parallel and perpendicular to the longitudinal axis of said locating bore, and releasable clamp means for clamping said outer means and intermediate means to position said third and fourth locating surfaces in contact with said fifth and sixth locating surfaces.

3. A fixture to factilitate calibrating position transducers respectively associated with at least three different articulated links serially connected in a chain to define a multi-link, multi-axis robot, each robot link including a rotary output member and a housing rotatably mounting said output member, each robot link of the chain further including means securing the housing associated therewith to the rotary output member associated with the next adjacent inner link of the chain, said fixture comprising:

outer means engageable with the rotary output member of the outermost link of the chain to prevent with respect to said outer means when engaged therewith both (a) rotary movement of said outermost rotary output member about its own axis and (b) rotary movement of said outermost rotary output member about a second rotary axis coincident with the axis of the rotary member which is secured to the actuator housing of the outermost link, which second rotary axis is angled to said axis of rotation of said outermost rotary output member, said outer means including a bore configured to snugly embrace the periphery of said outermost rotary output member when inserted therein, said bore having a locating element therein engageable with a corresponding locating member on the periphery of said outermost rotary output member to prevent rotation of said outermost rotary output member relative to said bore, inner means engageable with the innermost link which includes said housing for the innermost rotary output member, said inner means when engaged with said innermost link being immovable relative thereto both (a) axially along the length of said innermost link and (b) rotationally about the longitudinal axis of said innermost link, and intermediate means rigidly interconnecting said inner and outer means to prevent any relative movement therebetween, said intermediate means being connected relative to links disposed between said innermost link and said outermost link, solely through said inner means and said outer means, thereby locking all links of said chain against relative movement with respect to each other, and wherein said inner means and said intermediate means are detachable, said axis of rotation of said outermost rotary output member is orthogonal to the axis of the rotary output member which is secured to the actuator housing of said outermost link, said inner means includes a shaft disposed perpendicular to the rotational axis of said innermost rotary member when said inner means is engaged with said innermost link, said intermediate member includes a locating bore disposed parallel to said bore of said outer means, and selectively operable clamp means for temporarily clamping said shaft in said locating bore to temporarily couple said intermediate means and said inner means, and thereby orient the rotational axes of said rotary output members in mutually orthogonal directions when said intermediate means and inner means are temporarily coupled, and said inner means and innermost link are engaged, and said outermost rotary output member is engaged in said bore of said outer means.

* * * * *